Dec. 14, 1943.   Z. K. FERGUSON   2,336,726
SAW SWAGE AND SHAPER
Filed Feb. 19, 1942   2 Sheets-Sheet 2
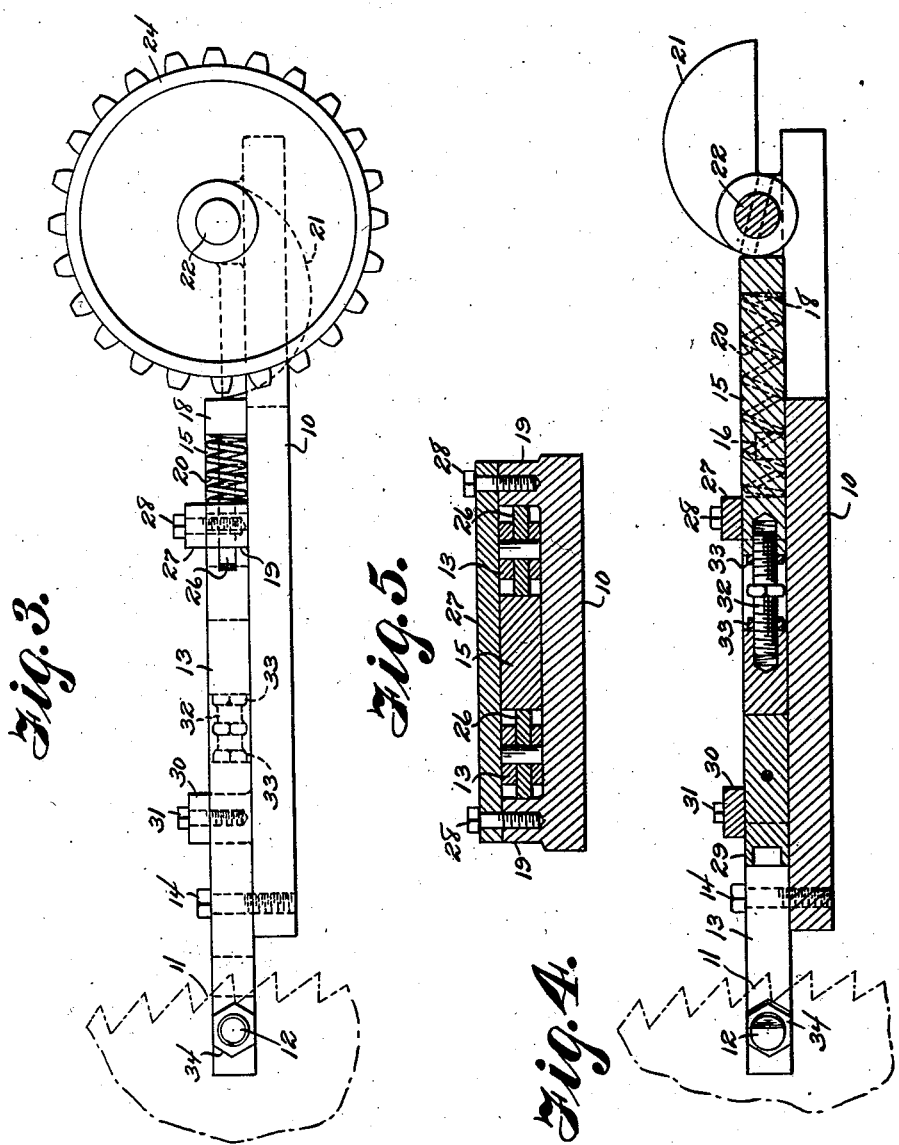
Zimrie Kinzie Ferguson
INVENTOR.
BY
Victor J. Evans & Co.
ATTORNEYS Patented Dec. 14, 1943

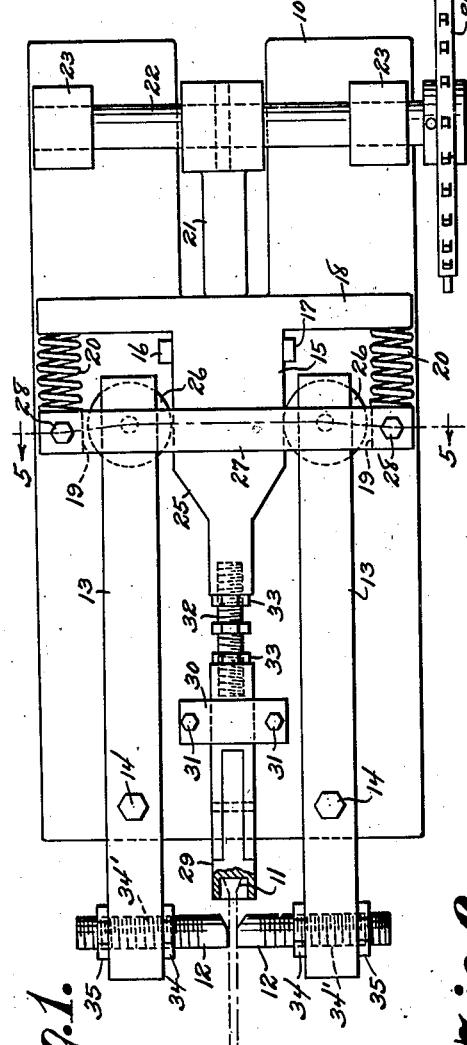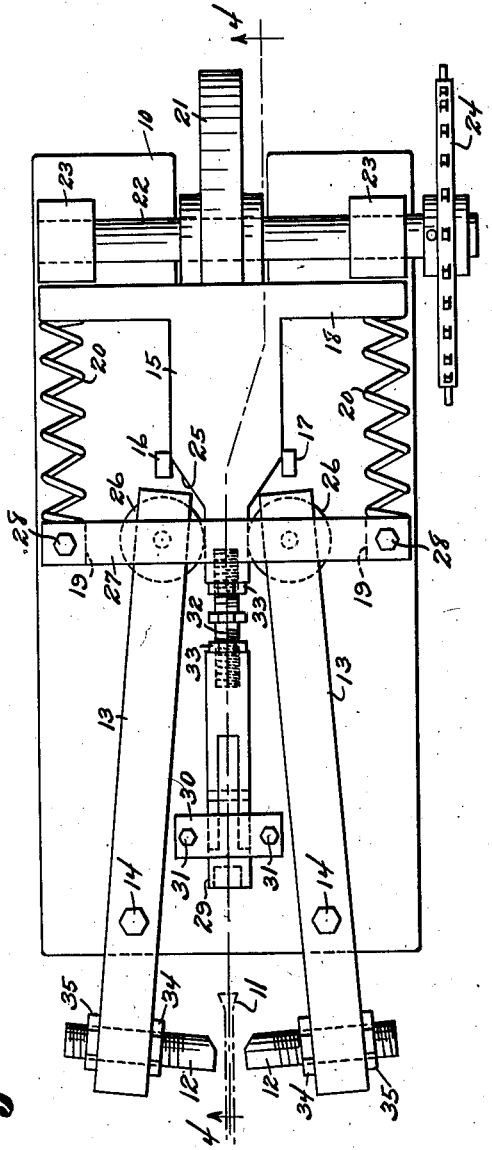

2,336,726

UNITED STATES PATENT OFFICE 2,336,726

SAW SWAGE AND SHAPER

Zimrie Kinzie Ferguson, Hazlehurst, Miss.

Application February 19, 1942, Serial No. 431,570

2 Claims. (Cl. 76—51)

This invention relates to a saw swage and shaper and has for an object to provide apparatus adapted to swage and shape both bandsaw and circular saw teeth, the apparatus being adapted to be driven by a conventional automatic saw grinding machine and being adapted to swage and shape the saw teeth at the same time they are being ground.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a plan view of a saw swage and shaper constructed in accordance with the invention, shown in position to swage or spread a saw tooth.

Figure 2 is a plan view of the apparatus showing the dies in position for effecting release of the saw tooth when the plunger moves to retracted position.

Figure 3 is a side elevation of the apparatus shown in Figure 1.

Figure 4 is a longitudinal sectional view of the apparatus taken on the line 4—4 of Figure 2.

Figure 5 is a cross sectional view of the apparatus taken on the line 5—5 of Figure 1.

Referring now to the drawings in which like characters of reference designate similar parts in the various views, 10 designates an adjustable head which is mounted in any preferred manner on a conventional automatic saw grinder so that it can be moved toward and away from the saw tooth 11. A pair of shaping dies 12 is carried by arms 13 which are pivoted at their forward ends on the head by pivot pins 14. The dies serve to clamp the saw teeth in position during the swaging operation, shown in Figure 1, in addition to their shaping function.

A reciprocating plunger 15 is mounted on the head between spaced guides 16 and is provided with a cross bar 18 between which and lugs 19 on the head, helical springs 20 are confined, to move the plunger in a retracted direction.

For moving the plunger in a forward direction a cam 21 is mounted on a transverse shaft 22 which is journaled in bearing blocks 23 on the head. One end of the shaft is equipped with a sprocket gear 24 which may be connected to another sprocket gear of the same size mounted on the cam shaft of the saw grinder, not shown. The cam 21 is adapted to engage the cross bar 18 of the plunger to move the plunger through its working stroke against the pressure of the springs 20.

The plunger is formed with a tapered portion 25, see Figures 1 and 2, adapted to be engaged by rollers 26, see Figure 5, which are movable laterally between the lugs 19 when the rollers ride onto or off of the tapered portion 25 of the plunger. The rollers are held in place by a cross bar 27 which is secured at the ends to the lugs by screws 28.

A swage 29, is an upset in common use by saw filers and is slideably mounted on the head 10 through the medium of a cross bar 30 which is engaged transversely across the upper side of the swage and is secured by screw bolts 31 or other connectors to the head 10. The rear end of the swage is adjustably secured to the plunger 15 by an adjusting screw 32 having a right thread at one end and a left thread at the other end engaged in the plunger and swage and held in adjusted positions by lock nuts 33 as shown in Figure 4.

The shaper dies 12 are likewise adjustably secured to the pivoted arms 13 through the medium of a screw threadedly engaged in openings 34 of the arms and held in adjusted position by lock nuts 35. The shaper dies act as clamps when the machine is being used as a swage by engaging the saw on opposite faces thereof as best shown in Figure 1.

In operation the plunger 15 is actuated by the cam 21 to its maximum position to the left as shown in Figure 1. As the cam rotates a few more degrees the plunger 15 will be moved to the right by the springs 20 and the rollers 26 can move down the tapered portion 25 of the plunger thereby allowing the arms 13 to rock, to cause the dies 12 to release the saw. At the same time the swage 29 is moved in a retrograde direction by the plunger and disengages from the saw tooth 11. As the grinder moves another saw tooth into position the cam 21 moves the plunger 15 to the left causing the dies 12 to clamp the saw, and as the plunger moves to its maximum position to the left the swage 29 swages the tooth 11.

To shape the saw tooth after it has been swaged the head 10 is moved to the right until the shaper dies 12 are in a position to press the saw tooth into shape.

From the above description it is thought that the construction and operation of the invention will be fully understood without further explanation.

What is claimed is:

1. A saw swage and shaper, comprising an adjustable head, arms intermediately pivoted to the head, shaping dies secured to the outer ends of the arms adapted to clamp the saw to the head, rollers on the inner ends of the arms, a plunger movable on the head towards and away from the shaping dies, a cross head carried by the rear end of the plunger, springs engaging said cross head and normally forcing the same towards the rear end of the head, a cam for engagement with the cross head for moving the same against the tension of the springs, said plunger provided with oppositely extending tapered portions adapted to engage the rollers for forcing the dies into engagement with a saw in advance of the engagement of the plunger with a saw.

2. A saw swage and shaper, comprising an adjustable head, arms intermediately pivoted to the head adjacent its outer end and extending beyond the same, shaping dies secured to the outer ends of the arms adapted to clamp a saw to the head, a roller carried by the inner end of each arm in a horizontal plane, a plunger arranged between the arms and movable on the head towards and away from the shaping dies, a cross head carried by the rear end of the plunger and provided with oppositely extending tapered portions adapted to engage the rollers, coil springs carried by the head and normally exerting a rearward pressure on the cross head, a shaft mounted on the head at the rear end of the same, a cam carried by the shaft and adapted to engage the cross head, and means for rotating said shaft whereby the cross head is forced outwardly to cause the dies to engage the saw in advance of the engagement of the plunger with the saw between the dies.

ZIMRIE KINZIE FERGUSON.